(12) United States Patent
Lin

(10) Patent No.: US 11,127,125 B2
(45) Date of Patent: Sep. 21, 2021

(54) IMAGE PROCESSING CIRCUIT AND ASSOCIATED IMAGE PROCESSING METHOD

(71) Applicant: Realtek Semiconductor Corp., HsinChu (TW)

(72) Inventor: Ming-Ta Lin, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 69 days.

(21) Appl. No.: 16/526,946

(22) Filed: Jul. 30, 2019

(65) Prior Publication Data

US 2020/0126199 A1 Apr. 23, 2020

(30) Foreign Application Priority Data

Oct. 22, 2018 (TW) .................................. 107137126

(51) Int. Cl.
*G06K 9/40* (2006.01)
*G06T 5/20* (2006.01)
*G06T 5/00* (2006.01)

(52) U.S. Cl.
CPC ................ *G06T 5/20* (2013.01); *G06T 5/002* (2013.01); *G06T 2207/20192* (2013.01)

(58) Field of Classification Search
None
See application file for complete search history.

(56) References Cited

U.S. PATENT DOCUMENTS

| 6,236,763 B1* | 5/2001 | Wong ......................... G06T 5/20 348/E5.077 |
| 7,657,098 B2 | 2/2010 | Lin et al. |
| 7,680,355 B2* | 3/2010 | Chiu ....................... H04N 19/61 382/266 |
| 9,934,554 B2* | 4/2018 | Nandi ................. G01S 7/52044 |
| 10,587,840 B1* | 3/2020 | Lin .......................... H04N 5/145 |
| 10,603,007 B2* | 3/2020 | Zhang .................. A61B 8/0825 |
| 10,621,702 B1* | 4/2020 | Robison .................... G06T 5/20 |
| 2005/0135699 A1* | 6/2005 | Anderson ............... G06T 5/002 382/261 |

(Continued)

FOREIGN PATENT DOCUMENTS

TW 200818863 4/2008

OTHER PUBLICATIONS

IDL, Filtering an Image, IDL Online Help (Jun. 16, 2005), https://northstar-www.dartmouth.edu/doc/idl/html_6.2/Filtering_an_Imagehvr.html#wp1022814 (Year: 2005).*

*Primary Examiner* — Sean M Conner
(74) *Attorney, Agent, or Firm* — Winston Hsu

(57) ABSTRACT

The present invention provides an image processing circuit including a region type determination circuit and a filtering circuit. In the operations of the image processing circuit, the region type determination circuit receives pixel values of a plurality of pixels within a region of an image frame, and uses a high-pass filter to filter the pixel values many times to generate a plurality of filtered pixel values, and determines if the region is an edge region, a non-edge region or a mosquito noise region to generate a determination result. The filtering circuit generates a plurality of weights according to the determination result, and uses the plurality of weights to filter a center pixel of the plurality of pixels within the region to generate an adjusted pixel value.

15 Claims, 8 Drawing Sheets

(56) References Cited

U.S. PATENT DOCUMENTS

| | | | |
|---|---|---|---|
| 2005/0220354 A1* | 10/2005 | Simon | G06T 5/50 |
| | | | 382/254 |
| 2006/0053007 A1* | 3/2006 | Niemisto | G10L 25/78 |
| | | | 704/233 |
| 2006/0245506 A1* | 11/2006 | Lin | H04N 19/117 |
| | | | 375/240.29 |
| 2007/0076972 A1* | 4/2007 | Chiu | H04N 19/61 |
| | | | 382/261 |
| 2007/0081596 A1* | 4/2007 | Lin | H04N 19/117 |
| | | | 375/240.27 |
| 2008/0085059 A1* | 4/2008 | Chao | G06K 9/56 |
| | | | 382/260 |
| 2015/0103250 A1* | 4/2015 | Watanabe | G06T 5/007 |
| | | | 348/576 |
| 2020/0126199 A1* | 4/2020 | Lin | G06T 5/002 |

\* cited by examiner

5*5 weights =

5*5 intensity weights

×

5*5 distance weights

IMAGE PROCESSING CIRCUIT AND ASSOCIATED IMAGE PROCESSING METHOD

BACKGROUND OF THE INVENTION

1. Field of the Invention

The present invention relates to an image processing circuit, and more particularly, to an image processing circuit capable of reducing mosquito noise.

2. Description of the Prior Art

In recent years, due to the rapid increase of the amount of image data, the image data needs to be compressed to save storage space and transmission bandwidth. However, since the image compression process usually causes distortion, the image generated by the decoding operations of displayer may become blurred at the edges and the phenomenon of blurred edges of the image is generally called mosquito noise. Since the mosquito noise has a bad influence on image quality, the mosquito noise has been improved in the prior art. However, the methods used in the prior art usually require complicated operations, and even have exponential operations. Besides, in the process of noise cancellation, other edges that do not have mosquito noise may be mistakenly processed to cause unnecessary image edge loss. Therefore, how to propose a simple and efficient method of noise cancellation is an important topic.

SUMMARY OF THE INVENTION

It is therefore an objective of the present invention to provide an image processing circuit, which can use a simple and efficient method to reduce the mosquito noise, to solve the above-mentioned problems.

In one embodiment of the present invention, an image processing circuit comprising a region type determination circuit and a filtering circuit is provided. In the operations of the image processing circuit, the region type determination circuit receives pixel values of a plurality of pixels within a region of an image frame, and uses a high-pass filter to perform high-pass filtering operations upon the region to generate a plurality of filtered pixel values, and determines if the region is an edge region, a non-edge region or a mosquito noise region to generate a determination result. The filtering circuit generates a plurality of weights according to the determination result, and uses the plurality of weights to filter a center pixel of the plurality of pixels within the region to generate an adjusted pixel value.

In another embodiment of the present invention, an image processing method comprises the steps of: receiving pixel values of a plurality of pixels within a region of an image frame; using a high-pass filter to perform high-pass filtering operations upon the region to generate a plurality of filtered pixel values; determining if the region is an edge region, a non-edge region or a mosquito noise region to generate a determination result; generating a plurality of weighs according to the determination result, and using the plurality of weights to filter a center pixel of the plurality of pixels within the region to generate an adjusted pixel value to a display panel to be displayed thereon.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Figure 3:
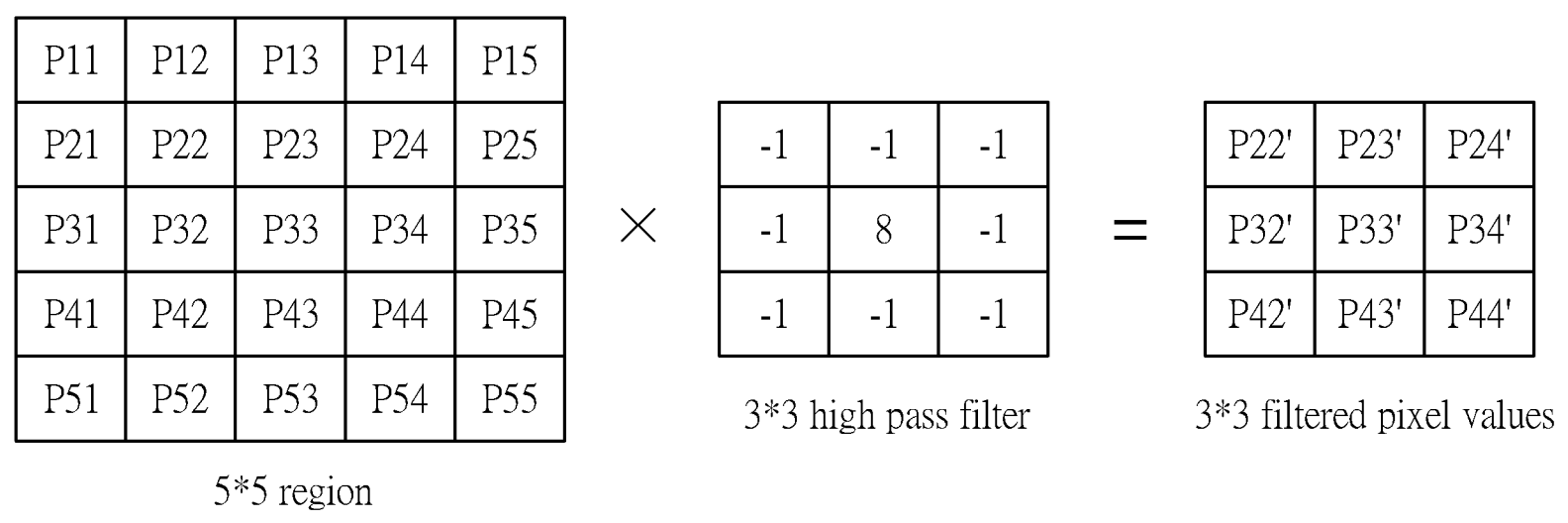

FIG. 3 is a diagram of using high-pass filter to filter the 5*5 region to generate 3*3 filtered pixel values according to one embodiment of the present invention.

FIG. 8 is a diagram of using the 5*5 distance weights and 5*5 intensity weights to obtain 5*5 weights according to one embodiment of the present invention.

DETAILED DESCRIPTION

Figure 1:
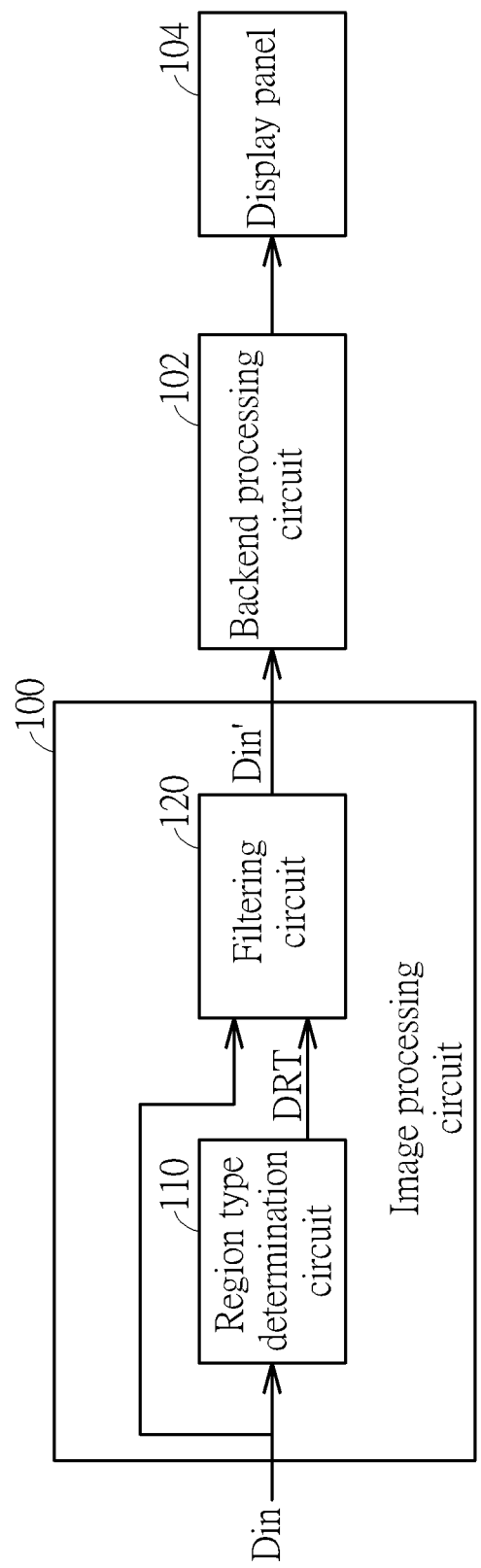
FIG. 1 is a diagram illustrating an image processing circuit according to one embodiment of the present invention.

FIG. 1 is a diagram illustrating an image processing circuit 100 according to one embodiment of the present invention. As shown in FIG. 1, the image processing circuit 100 comprises a region type determination circuit 110 and a filtering circuit 120, wherein the image processing circuit 100 is configured to receive an image frame Din and perform noise cancellation operations upon the image frame Din to generate an adjusted image frame Din', and the adjusted image frame Din' is processed by a backend processing circuit 102 and then transmitted to display panel 104 to be displayed thereon.

In the operations of the image processing circuit 100, the region type determination circuit 110 receives the image frame Din; and for each pixel, the region type determination circuit 110 determines if the pixel belongs to an edge region, an non-edge region or a mosquito noise region to generate a determination result DRT. Specifically, refer to FIG. 2 that shows the flowchart of the operations of the region type determination circuit 110 according to one embodiment of the present invention. In Step 200, the flow starts, and the region type determination circuit 110 receives the image frame Din. In Step 202, the region type determination circuit 110 selects a 5*5 region according to a pixel required to be processed now, wherein the pixel is a center pixel within the 5*5 region. As shown in FIG. 3, if the pixel P33 is to be processed, the region type determination circuit 110 selects the 5*5 region comprising pixels P11-P55 whose center pixel is P33. Then, the region type determination circuit 110 uses a 3*3 high-pass filter such as a Laplacian mask shown in FIG. 3 to perform nine filtering operations upon the pixels within the 5*5 regions to generate 3*3 filtered pixel values. In one embodiment, the region type determination circuit 110 performs the high-pass filtering operations upon the pixel P22, P23, P24, P32, P33, P34, P42, P43 and P44 to generate filtered pixel values P22', P23', P24', P32', P33', P34', P42', P43' and P44'. For example, when the region type determination circuit 110 performs the high-pass filtering operations upon the pixel P22, the center of the 3*3 high-pass filter is focused on the pixel P22, and the parameters of the 3*3 high-pass filter are used for the weighted summation of the pixels P11-P33 to generate the filtered pixel value P22'. The calculation of the filtered pixel value P22' is provided for reference:

$$P22'=(-1)*P11+(-1)*P12+(-1)*P13+(-1)*P21+\\8*P22+(-1)*P23+(-1)*P31+(-1)*P32+(-1)*P33.$$

In Step 206, the region type determination circuit 110 calculates an non-edge count and an edge count according to the above-mentioned nine filtered pixel values, wherein the non-edge count is the number of the nine filtered pixel values lower than a first reference pixel value (e.g. the first reference pixel value may be "256"), and the edge count is the number of the nine filtered pixel values greater than a second reference pixel value (e.g. the second reference pixel value may be "512").

Figure 2:
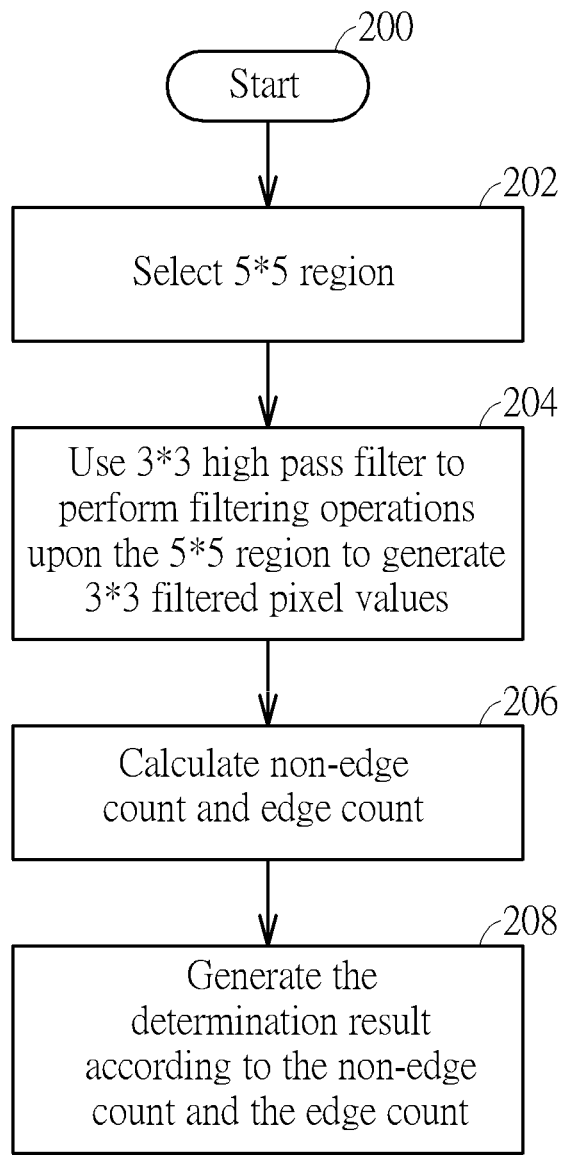
FIG. 2 is a flowchart of the operations of the region type determination circuit according to one embodiment of the present invention.

In Step 208, the region type determination circuit 110 determines if the 5*5 region shown in FIG. 2 is the edge region, the non-edge region or the mosquito noise region according to the non-edge count and the edge count. For example, if the non-edge count is greater than a first threshold value (e.g. the first threshold value is "8"), the region type determination circuit 110 determines that the 5*5 region is the non-edge region; if the edge count is greater than a second threshold value (e.g. the second threshold value is "5"), the region type determination circuit 110 determines that the 5*5 region is the edge region; and if the non-edge count is not greater than the first threshold value and the edge count is not greater than the second threshold value, the region type determination circuit 110 determines that the 5*5 region is the mosquito noise region.

In the embodiments shown in FIG. 2 and FIG. 3, the region type determination circuit 110 uses the 3*3 high-pass filter to perform many filtering operations upon the 5*5 region to generate the 3*3 filtered pixel values, and then the region type determination circuit 110 determines if the 5*5 region is the edge region, the non-edge region or the mosquito region according to the 3*3 filtered pixel values; therefore, since the above calculations only involve the integer operations, the corresponding circuits will have simpler structure, and the design and manufacturing costs of the region type determination circuit 110 can be reduced.

Figure 4:
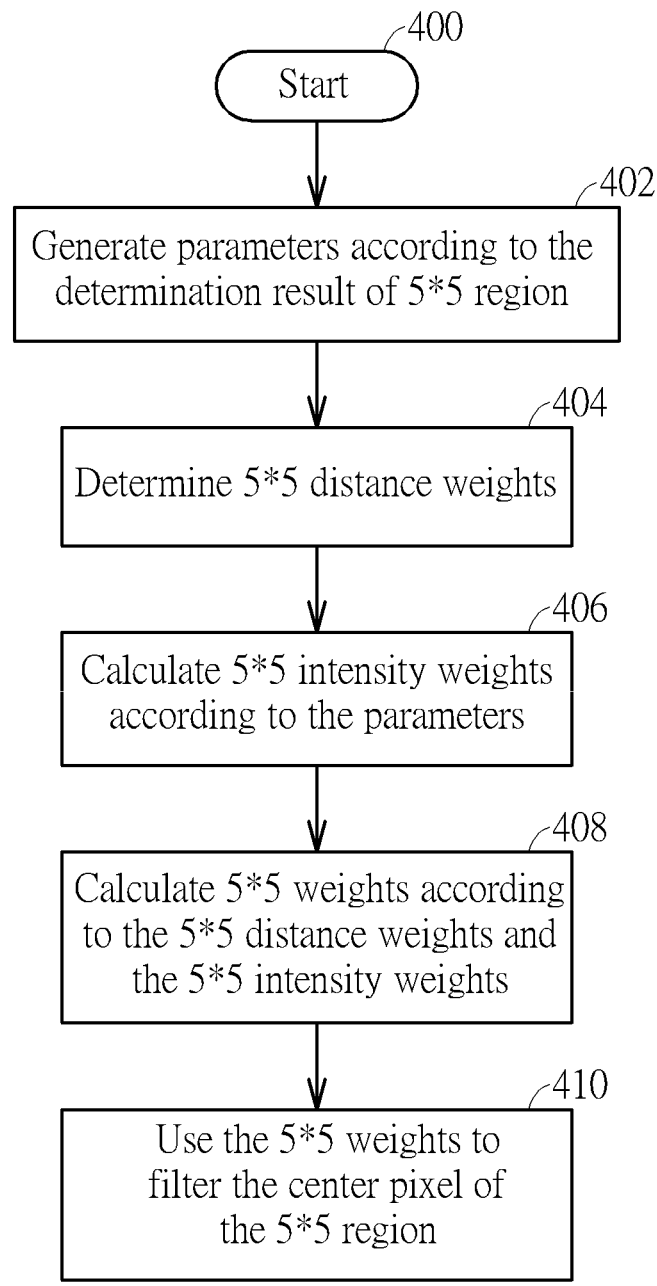
FIG. 4 is a flowchart of the operations of the filtering circuit according to one embodiment of the present invention.

After the region type determination circuit 110 determines that the 5*5 region belongs to the edge region, the non-edge region or the mosquito noise region, the filtering circuit 120 performs the noise cancellation operations upon the center pixel P33 to generate an adjusted pixel value P33" according to the determination result DRT. Specifically, refer to FIG. 4 that shows the flowchart of the operations of the filtering circuit 120 according to one embodiment of the present invention. In Step 400, the flow starts, the filtering circuit 120 receives the determination result DRT and the pixel values of the 5*5 region shown in FIG. 2. In Step 402, the filtering circuit 102 determines a plurality of parameters according to the determination result DRT. For example, refer to FIG. 5 that shows a flowchart of using the filtering circuit 120 to determine the parameters according to the determination result DRT according to one embodiment of the present invention. The flow is described as follows.

Step 500: the flow starts.

Step 502: determine if the 5*5 region is the non-edge region. If the 5*5 region is the non-edge region, the flow enters Step 504; otherwise, the flow enters Step 506.

Step 504: set the parameters TH1, TH2 and TH3 to be "64", "100" and "256", respectively.

Step 506: determine if the 5*5 region is the edge region. If the 5*5 region is the edge region, the flow enters Step 508; otherwise, the flow enters Step 510.

Step 508: set the parameters TH1, TH2 and TH3 to be "100", "256" and "576", respectively.

Step 510: determine that the 5*5 region is the mosquito noise region.

Step 512: set the parameters TH1, TH2 and TH3 to be "256", "576" and "1024", respectively.

Figure 5:
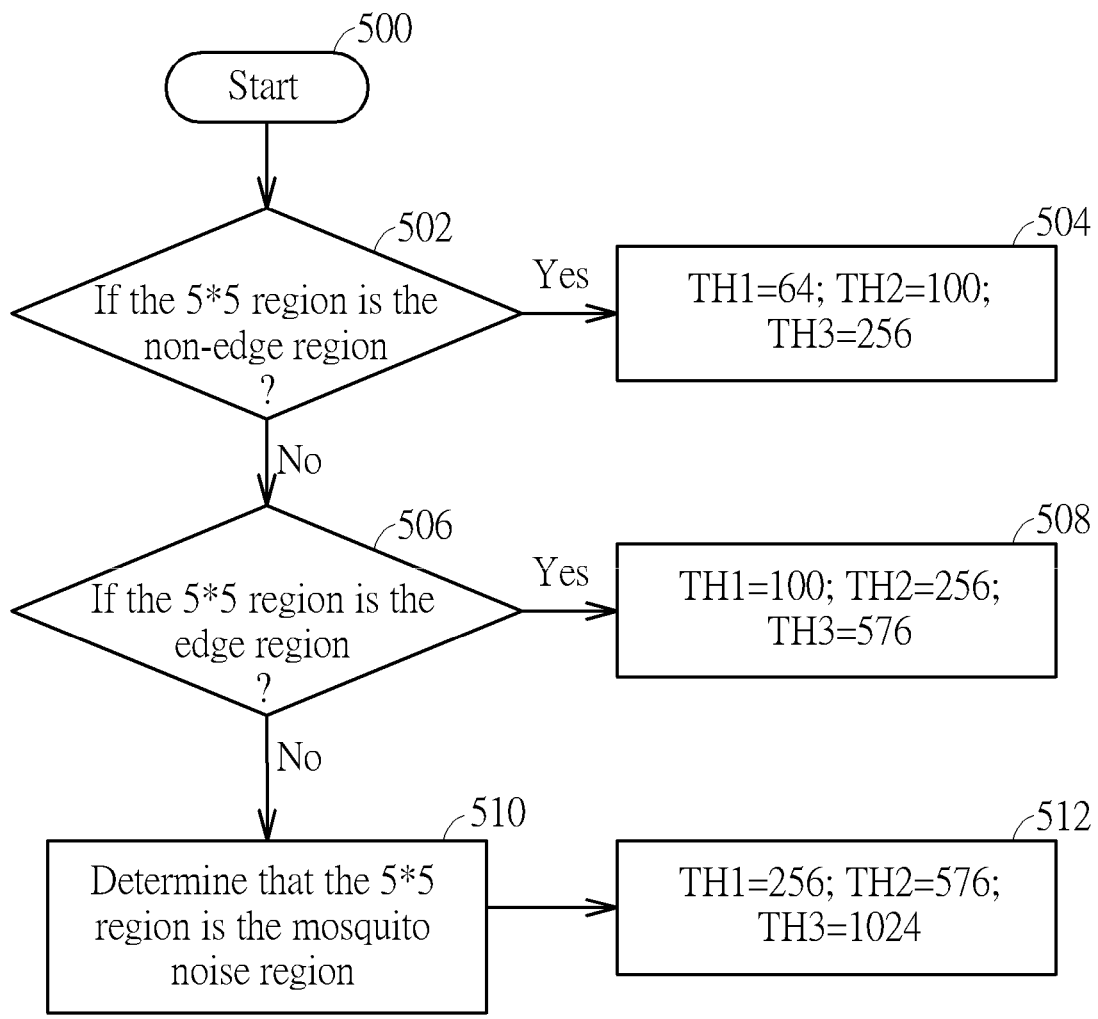
FIG. 5 is a flowchart of using the filtering circuit to determine a plurality of parameters according to the determination result according to one embodiment of the present invention.

It is noted that the parameters TH1, TH2 and TH3 shown in FIG. 5 are for illustrative purposes only, and not a limitation of the present invention. As long as the parameters of the edge region are greater than the parameters of the non-edge region, and the parameters of the mosquito noise region are greater than the parameters of the edge region, these parameters can be determined according to the designer's consideration.

Figure 6:
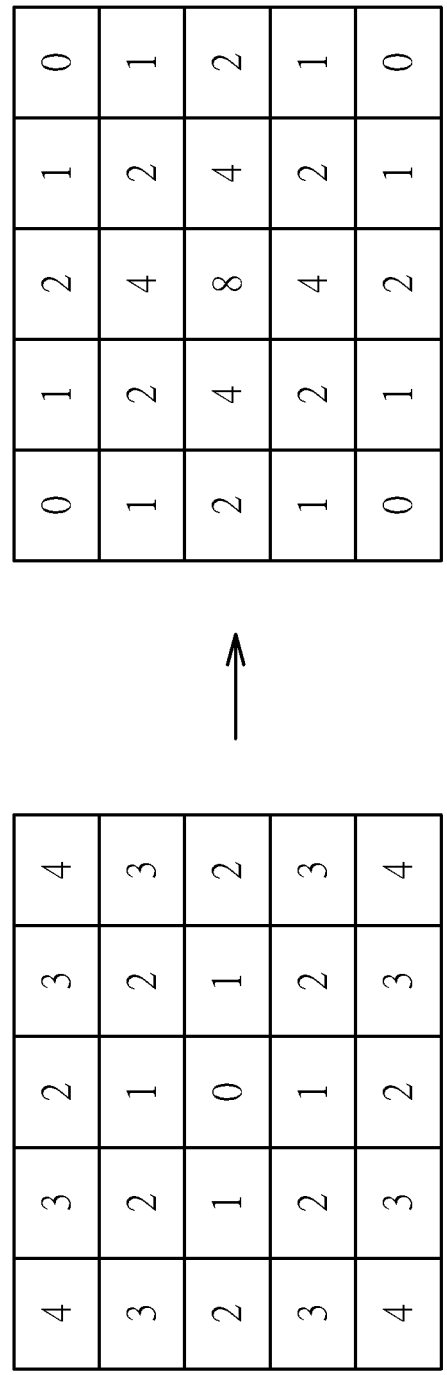
FIG. 6 is a diagram showing 5*5 distance weights according to one embodiment of the present invention.

In Step 404, the filtering circuit 120 determines a plurality of distance weights such as 5*5 distance weights. As shown in FIG. 6, the left image shows the distance from each pixel to the center pixel, and the right image shows the 5*5 distance weights converted from the distance from each pixel to the center pixel, wherein for each pixel, the closer the distance to the center pixel, the higher the distance weight.

Figure 7:
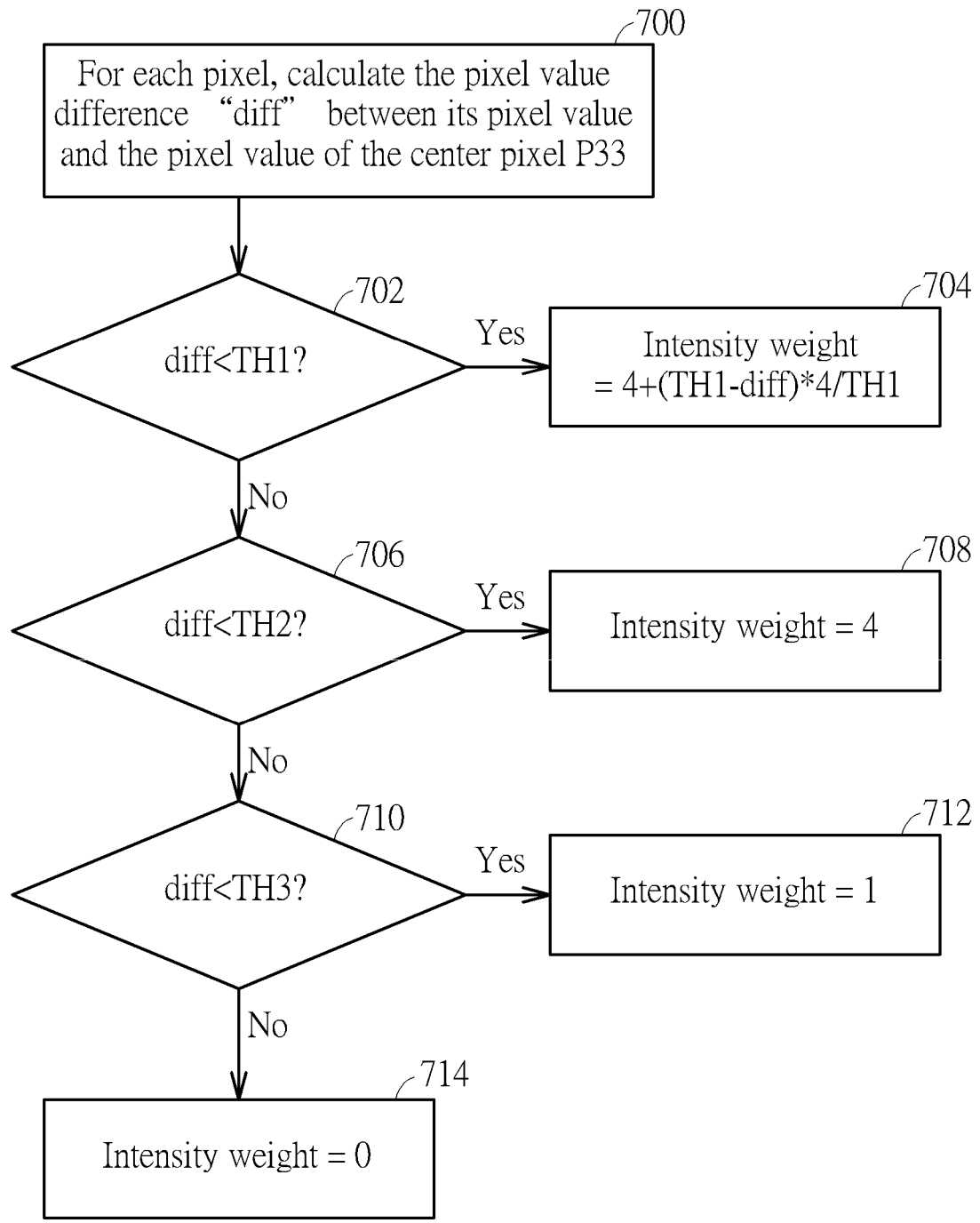
FIG. 7 is a flowchart of using the filtering circuit to determine a plurality of intensity weights according to one embodiment of the present invention.

In Step 406, the filtering circuit generates a plurality of intensity weights according to the parameters TH1, TH2 and TH3 and the pixel values within the 5*5 region. Refer to FIG. 7 that shows a flowchart of using the filtering circuit 120 to determine the intensity weights according to one embodiment of the present invention. The flow is described as follows.

Step 700: for each pixel, calculate a pixel value difference between its pixel value and the pixel value of center pixel P33.

Step 702: determine if the pixel value difference is lower than the parameter TH1. If yes, the flow enters Step 704; if not, the flow enters Step 706.

Step 704: calculate the intensity weight by using the formula: 4+(TH1−diff)*4/TH1, wherein "diff" is the pixel value difference.

Step 706: determine if the pixel value difference is lower than the parameter TH2. If yes, the flow enters Step 708; if not, the flow enters Step 710.

Step 708: determine the intensity weight "4".

Step 710: determine if the pixel value difference is lower than the parameter TH3. If yes, the flow enters Step 712; if not, the flow enters Step 714.

Step 712: determine the intensity weight "1".

Step 714: determine the intensity weight "0".

It is noted that the intensity weights shown in FIG. 7 are for illustrative purposes only, and not a limitation of the present invention. As long as the pixel value difference is higher, the corresponding intensity weight is lower, and calculation details of the intensity weight can be determined according to the designer's considerations. In this embodiment, because the pixel value difference is higher, the corresponding intensity weight is lower, the influence of the pixels with a large pixel value difference in the peripheral region of the pixel P33 when the noise cancellation operation is performed on the pixel P33 can be improved to avoid excessive blurring the edge of the image.

Figure 8:
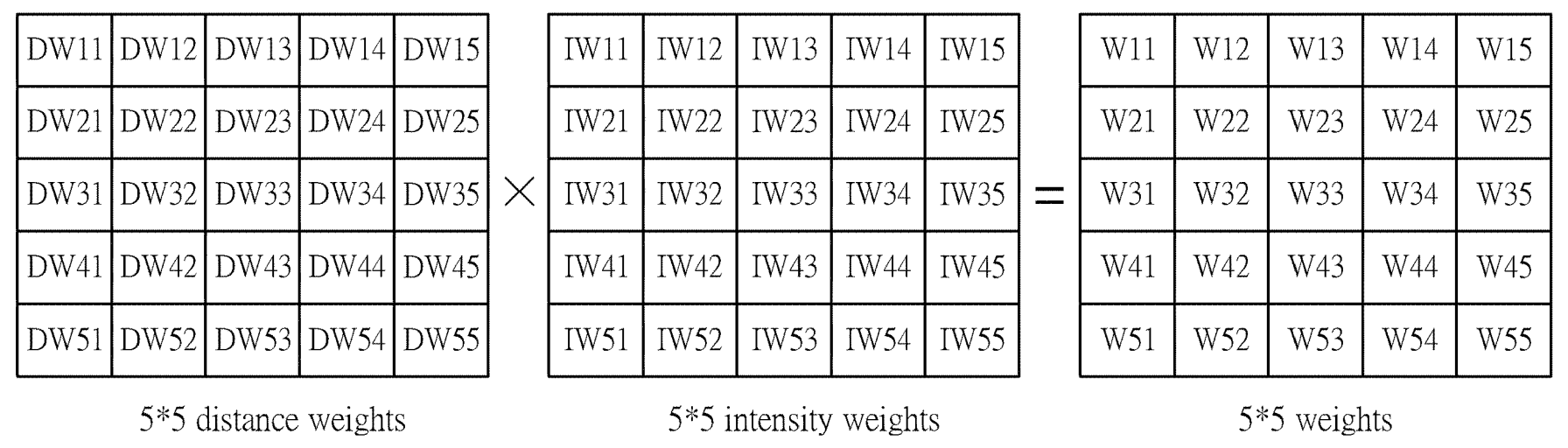

In Step 408, the filtering circuit 120 multiplies the distance weights by the intensity weights to generate a plurality of weights. Taking FIG. 8 as an example, because the Step 404 generates the 5*5 distance weights (e.g. DW11-DW55 shown in FIG. 8), and the Step 406 generates the 5*5 intensity weights (e.g. IW11-IW55 shown in FIG. 8), the filtering circuit 120 can directly multiply each of the 5*5 distance weights by the corresponding intensity weight having the same position in the 5*5 intensity weights to generate the 5*5 weights. For example, W11=DW11*IW11, W12=DW12*IW12, W13=DW13*IW13, . . . and so on.

After the 5*5 weights are determined, in Step 410, the filtering circuit 120 uses the 5*5 weights to filter the pixel P33, that is the 5*5 weights are used for calculating the weighted average of the pixel values of the pixels P11-P55 to obtain the adjusted pixel value P33". That is, the adjusted pixel value P33" can be calculated as follows:

$$P33'' = \frac{\sum_{j=1-5}^{i=1-5} Pij * Wij}{\sum_{j=1-5}^{i=1-5} Wij}.$$

In light of above, the filtering operation (i.e. noise cancellation operation) for the pixel P33 is completed. By using the same calculating steps, the image processing circuit 100 can perform the filtering operations on each pixel of the image frame Din to obtain the adjusted image frame Din'.

In the embodiments shown in FIGS. 4-8, because the 5*5 weights have different characteristics for the edge region, non-edge region and the mosquito noise region, and the determination of the 5*5 weights only involve the integer operations, the circuits can have the simpler structure, and the design and manufacturing cost of the filtering circuit 120 can be reduced.

In addition, although the above-mentioned embodiments use the 5*5 region, 3*3 high-pass filter, 3*3 filtered pixel values, 5*5 distance weights, 5*5 intensity weights and 5*5 weights, these data sizes are not limitations of the present invention. In other embodiments, the region type determination circuit 110 can use a M*M high-pass filter to perform the filtering operations upon an N*N region many times to generate the filtered pixel values, where N is any suitable number greater than M; and the filtering circuit 120 can multiply K*K distance weights by K*K intensity weights to obtain K*K weights where K can be any suitable value.

Briefly summarized, in the image processing circuit and the image processing method of the present invention, it is determined that the region of the image is the non-edge region, the edge region or the mosquito noise region, then the filtering circuit calculates different weights for the noise cancellation operations according to the determination result of the region. In the present invention, the corresponding processing circuits can effectively cancel the noise by using the simple calculating steps, so the design and manufacturing costs of the image processing circuit can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
   a region type determination circuit, arranged to receive pixel values of a plurality of pixels within a region of an image frame, and using a high-pass filter to perform high-pass filtering operations upon the region to generate a plurality of filtered pixel values, and determining if the region is an edge region, a non-edge region or a mosquito noise region to generate a determination result according to the plurality of filtered pixel values; and
   a filtering circuit, arranged to generate a plurality of weights according to the determination result, and using the plurality of weights to filter a center pixel of the plurality of pixels within the region to generate an adjusted pixel value;
   wherein the region comprises 5*5 pixels, the high-pass filter is a 3*3 spatial filter, and the region type determination circuit uses the high-pass filter to perform high-pass filtering operations for nine times upon the region to generate nine filtered pixel values.

2. The image processing circuit of claim 1, wherein the region type determination circuit calculates an non-edge count and an edge count according to the plurality of filtered pixel values, and determines if the region is the edge region, the non-edge region or the mosquito noise region to generate the determination result according to the non-edge count and the edge count.

3. The image processing circuit of claim 2, wherein the non-edge count is a number of the plurality of filtered pixel values lower than a first reference pixel value, the edge count is a number of the plurality of filtered pixel values greater than a second reference pixel value, and the second reference pixel value is greater than the first reference pixel value.

4. The image processing circuit of claim 2, wherein when the non-edge count is greater than a first threshold value, the region type determination circuit determines that the region is the non-edge region; when the edge count is greater than a second threshold value, the region type determination circuit determines that the region is the edge region; and when the non-edge count is not greater than the first threshold value, and the edge count is not greater than the second threshold value, the region type determination circuit determines that the region is the mosquito noise region.

5. An image processing circuit, comprising:
   a region type determination circuit, arranged to receive pixel values of a plurality of pixels within a region of an image frame, and using a high-pass filter to perform high-pass filtering operations upon the region to generate a plurality of filtered pixel values, and determining if the region is an edge region, a non-edge region or a mosquito noise region to generate a determination result according to the plurality of filtered pixel values; and
   a filtering circuit, arranged to generate a plurality of weights according to the determination result, and using the plurality of weights to filter a center pixel of the plurality of pixels within the region to generate an adjusted pixel value;
   wherein the filtering circuit generates a plurality of parameters according to the determination result, and generates a plurality of intensity weights according to the plurality of parameters and the plurality of pixel values, and multiplies the plurality of intensity weights by a plurality of distance weights to generate the plurality of weights.

6. The image processing circuit of claim 5, wherein the plurality of parameters defines a plurality of intervals, the plurality of intensity weights respectively correspond to the plurality of pixels in position, the filtering circuit calculates a pixel value difference between each pixel and the center pixels, and determines the corresponding intensity weight of each pixel according to the interval the pixel value difference belongs to.

7. The image processing circuit of claim 6, wherein the higher the pixel value difference, the lower the intensity weight of the pixel.

8. The image processing circuit of claim 6, wherein the plurality of distance weights respectively correspond to the plurality of pixels in position, and for each pixel, the closer the distance to the center pixel, the higher the distance weight.

9. An image processing method, comprising:
receiving pixel values of a plurality of pixels within a region of an image frame;
using a high-pass filter to perform high-pass filtering operations upon the region to generate a plurality of filtered pixel values;
determining if the region is an edge region, a non-edge region or a mosquito noise region to generate a determination result according to the plurality of filtered pixel values; and
generating a plurality of weights according to the determination result, and using the plurality of weights to filter a center pixel of the plurality of pixels within the region to generate an adjusted pixel value;
wherein the step of determining if the region is the edge region, the non-edge region or the mosquito noise region to generate the determination result comprises:
calculating an non-edge count and an edge count according to the plurality of filtered pixel values; and
determining if the region is the edge region, the non-edge region or the mosquito noise region to generate the determination result according to the non-edge count and the edge count;
wherein the non-edge count is a number of the plurality of filtered pixel values lower than a first reference pixel value, the edge count is a number of the plurality of filtered pixel values greater than a second reference pixel value, and the second reference pixel value is greater than the first reference pixel value.

10. The image processing method of claim 9, wherein the region comprises 5*5 pixels, the high-pass filter is a 3*3 spatial filter, and the step of using the high-pass filter to filter the pixel values to generate the plurality of filtered pixel values comprises:
using the high-pass filter to perform nine high-pass filtering operations upon the region to generate nine filtered pixel values.

11. The image processing method of claim 9, wherein the step of determining if the region is the edge region, the non-edge region or the mosquito noise region to generate the determination result comprises:
when the non-edge count is greater than a first threshold value, determining that the region is the non-edge region;
when the edge count is greater than a second threshold value, determining that the region is the edge region; and
when the non-edge count is not greater than the first threshold value, and the edge count is not greater than the second threshold value, determining that the region is the mosquito noise region.

12. The image processing method of claim 9, wherein the step of generating the plurality of weights according to the determination result, and using the plurality of weights to filter the center pixel of the plurality of pixels within the region to generate the adjusted pixel value comprises:
generating a plurality of parameters according to determination result;
generating a plurality of intensity weights according to the plurality of parameters and the plurality of pixel values; and
multiplying the plurality of intensity weights by a plurality of distance weights to generate the plurality of weights.

13. The image processing method of claim 12, wherein the plurality of parameters defines a plurality of intervals, the plurality of intensity weights respectively correspond to the plurality of pixels in position, and the step of generating the plurality of intensity weights according to the plurality of parameters and the plurality of pixel values comprises:
calculating a pixel value difference between each pixel and the center pixels; and
determining the corresponding intensity weight of each pixel according to the interval that the pixel value difference belongs to.

14. The image processing method of claim 13, wherein the higher the pixel value difference, the lower the intensity weight of the pixel.

15. The image processing method of claim 13, wherein the plurality of distance weights respectively correspond to the plurality of pixels in position, and for each pixel, the closer the distance to the center pixel, the higher the distance weight.

* * * * *